US008026833B2

(12) United States Patent
Villaume et al.

(10) Patent No.: US 8,026,833 B2
(45) Date of Patent: Sep. 27, 2011

(54) METHOD AND DEVICE FOR GENERATING A TAXIING SPEED FOR AN AIRCRAFT OF A CONVOY

(75) Inventors: Fabrice Villaume, Seysses (FR); Pierre Scacchi, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 329 days.

(21) Appl. No.: 12/475,213

(22) Filed: May 29, 2009

(65) Prior Publication Data
US 2009/0295601 A1 Dec. 3, 2009

(30) Foreign Application Priority Data
Jun. 2, 2008 (FR) ...................... 08 03003

(51) Int. Cl.
*G08G 5/04* (2006.01)
(52) U.S. Cl. ........ 340/961; 340/950; 340/982; 340/972; 340/435; 340/436; 701/3; 701/15
(58) Field of Classification Search .................. 340/903, 340/961, 985, 992, 466; 701/3, 14–16, 120–122, 701/300–301
See application file for complete search history.

(56) References Cited

U.S. PATENT DOCUMENTS

| 5,400,864 | A | * | 3/1995 | Winner et al. | ................ 180/169 |
| 5,969,640 | A | * | 10/1999 | Timm et al. | ................... 340/903 |
| 6,032,097 | A | | 2/2000 | Iihoshi | |
| 6,144,915 | A | * | 11/2000 | Shiomi et al. | ................. 701/120 |
| 6,223,117 | B1 | * | 4/2001 | Labuhn et al. | ................... 701/93 |
| 6,604,044 | B1 | * | 8/2003 | Kirk | .............................. 701/120 |
| 6,703,944 | B1 | * | 3/2004 | Obradovich | ................. 340/903 |
| 7,212,920 | B1 | * | 5/2007 | Bailey et al. | ................. 701/211 |
| 7,340,327 | B2 | * | 3/2008 | Villaume et al. | ................. 701/15 |
| 7,623,956 | B2 | * | 11/2009 | Kawaguchi | .................... 701/117 |
| 7,747,360 | B2 | * | 6/2010 | Canu-Chiesa et al. | ............ 701/3 |
| 7,772,992 | B2 | * | 8/2010 | Fetzmann et al. | ............ 340/961 |
| 2004/0049343 | A1 | | 3/2004 | Yamadaji | |

OTHER PUBLICATIONS

Preliminary Search Report dated Apr. 2, 2009 w/ English translation.
A. Awawdeh, et al., "Non-linear Trajectory Generation and Lateral Control New Algorithms to Minimize Platoon's Oscillations," American Control Conference, 2004, Proceedings of the 2004 Boston, MA, USA Jun. 30-Jul. 2, 2004, Piscataway, NJ, USA IEEE, vol. 4, Jun. 30, 2004, pp. 3345-3350.

* cited by examiner

*Primary Examiner* — Daniel Wu
*Assistant Examiner* — Son M Tang
(74) *Attorney, Agent, or Firm* — Dickinson Wright PLLC

(57) ABSTRACT

The device (1) comprises means (5) for calculating a controlled speed enabling the aircraft to observe a longitudinal separation relative to an aircraft of the convoy that precedes it.

10 Claims, 9 Drawing Sheets

METHOD AND DEVICE FOR GENERATING A TAXIING SPEED FOR AN AIRCRAFT OF A CONVOY

Figure 1:
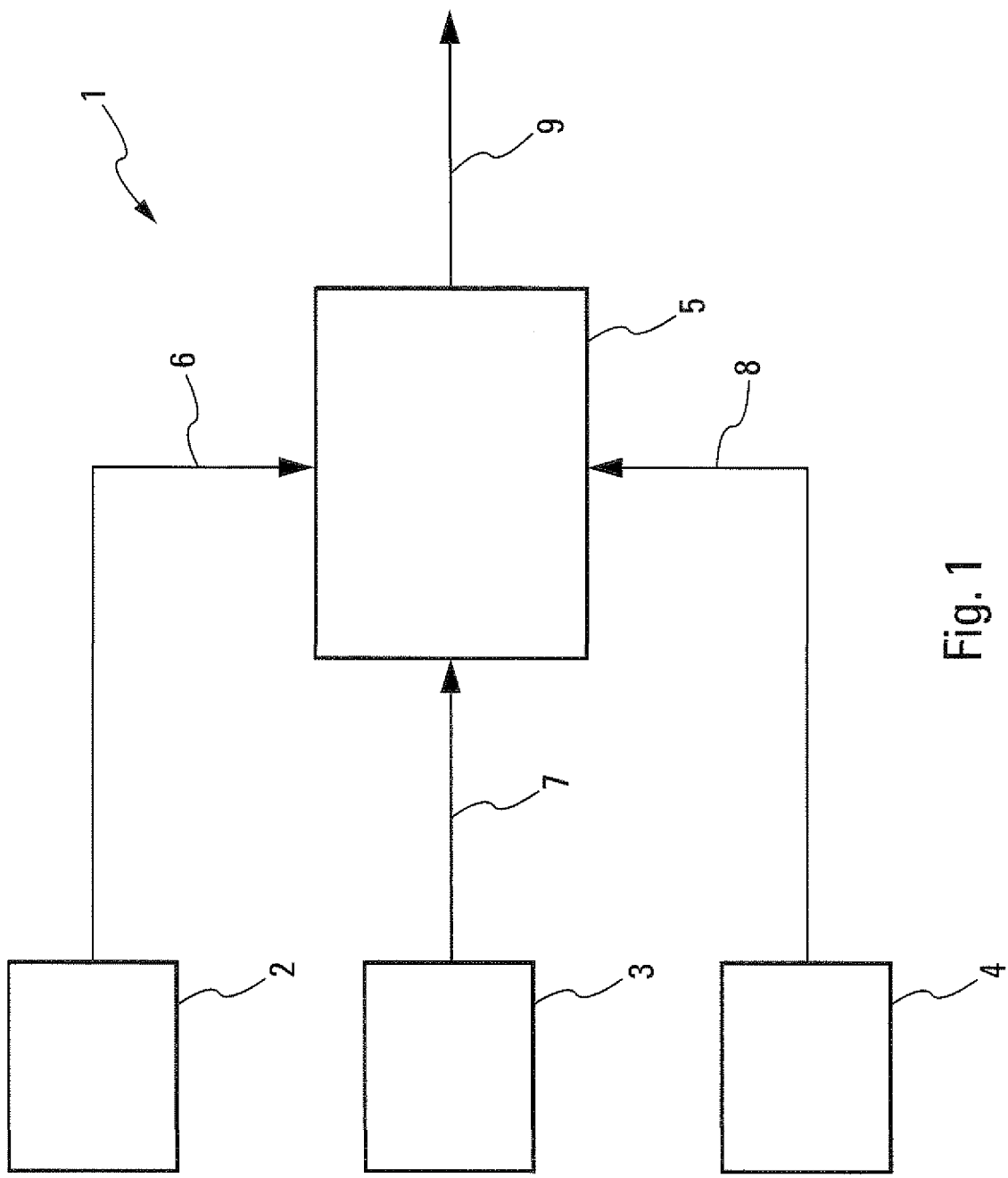

The present invention relates to a method and a device for generating a controlled speed for an aircraft taxiing on the ground in a convoy of aircraft. It also relates to an automatic longitudinal guidance method and system for an aircraft taxiing on the ground in a convoy of aircraft, particularly in an airfield such as an aerodrome or an airport.

The present invention therefore applies to the taxiing of an aircraft on the ground, particularly an airplane, civilian or military, for transporting passengers or freight, or even a drone. It more particularly relates to an automatic longitudinal guidance enabling an aircraft taxiing on the ground in a convoy of aircraft to observe at least one longitudinal separation relative to another aircraft of the convoy.

In the context of the present invention:
the expression "taxiing on the ground" should be understood to mean any possible type of taxiing of an aircraft, such as taxiing on a landing runway during landing and take-off phases, or taxiing on taxiways or on maneuvering areas, in particular;
the expression "convoy of aircraft" should be understood to mean a coherent set of at least two aircraft following one another in single file. This set is coherent if the members of the convoy are likely to exchange between them and with ground control information making it possible to follow a trajectory on the ground according to a behavior (particularly in terms of speed and/or acceleration) suited to the stability and the safety of the convoy; and
the expression "automatic longitudinal guidance" should be understood to mean the action of a system capable of handling, partially or totally, that is, without assistance or with the partial assistance of a (human) operator, the control of an aircraft on the ground according to its longitudinal axis.

Currently, the (human) pilot controls the movements of the aircraft on the ground, using manual piloting members (for example a control wheel used to steer the wheel of the front landing gear, an engine thrust control lever, brake pedals, a rudder bar), along a trajectory on the ground. These members are used to control actuators of the aircraft capable of influencing the movements of the aircraft, in particular through the intermediary of the engines, the brakes, the orientation of the wheel of the front landing gear (and possibly the orientation of the rear landing gears), and the vertical stabilizer rudder.

"Trajectory on the ground" designates the path taken by the aircraft on an airfield such as an aerodrome or an airport, including in particular the take-off and landing runways, the taxiways, the turn-around areas, the waiting bays, the stop bars, the stop positions (stands), the maneuvering areas and the parking areas.

The trajectory on the ground is generally supplied to the pilot, in particular via radiocommunication means or another standard means such as a digital data transmission link, by an air traffic controller or by a ground controller, but it can also, in certain cases, be chosen freely by the pilot.

The trajectory is defined in the form of a succession of elements of the airport, and it indicates a path with which to reach, from a point or region of the airfield, another point or region of that field.

The expression "element of the airfield" is used to mean any portion of the field, designated or not by a name, and identified as a distinct and delimited part of the field. An element can, if necessary, include one or more others. "Element" designates in particular the take-off and landing runways, the taxiways, the turn-around areas, the waiting bays, the stop bars, the stop positions (stands), the maneuvering areas and the parking areas.

Knowing the ground trajectory to be followed, the pilot acts on the abovementioned piloting members, in order to control the movements of the aircraft on the ground (the longitudinal speed and lateral displacements of the aircraft). He also does so to follow the trajectory so that all parts of the aircraft in contact with the ground (the wheels of the front and rear landing gears) remain permanently on the surface provided for aircraft taxiing. For most airports accommodating civilian or military transport airplanes, "ground" should be understood to mean the parts covered with tarmac and provided for that purpose. The objective of the pilot is therefore to manage a trajectory in such a way that none of the parts of the aircraft in contact with the ground is at a given moment on a portion of the airfield not designed for aircraft taxiing, in particular portions covered with grass, earth or sand, or portions designed only for taxiing of lighter vehicles (cars, trucks).

In this taxiing-on-the-ground phase, the pilot may be required, on instruction or otherwise from ground control, to follow another aircraft taxiing on the ground at a given distance, which can be likened to an informal and non-coherent convoy of two aircraft. This is generally the case when they both follow one and the same trajectory portion, or they go to places close to the airport.

The manual piloting of an aircraft on the ground is a major workload for the pilot. The latter must in practice:
follow the trajectory provided, controlling both the speed of the aircraft with the engine thrust levers and the brake pedals, and the rotation along the yaw axis with the control wheel and rudder bar;
be careful not to depart from the surface provided for aircraft taxiing; and
monitor the external environment, in particular:
the movements of the other vehicles maneuvering in the airport area, in particular the aircraft taxiing on the ground, taking off or landing, cars and trucks; and
obstacles present around the aircraft and likely to cause a collision with the latter, in particular buildings, passenger loading bridges, antennas, indication and signaling panels, and other vehicles on the ground, whether immobile or not (aircraft, cars, trucks, mobile passenger loading bridges).

This major workload can, consequently, affect the vigilance of the pilot, and lead, in particular, to an unscheduled trajectory being followed, departures from the surface provided for aircraft taxiing, and collisions with other vehicles or obstacles that can cause significant material and human damage.

In these conditions, manually following another aircraft at the correct speed and at the correct distance (with a safety distance to be observed) represents an additional workload for the pilot, and can prove difficult, even impossible, if the operational conditions are degraded (for example: reduced visibility, bad weather, wet or contaminated runway)

Moreover, even assuming the best case scenario where the pilot has an automatic taxiing function and only has to manually control the speed of the aircraft (the trajectory being followed laterally automatically), manual piloting leads to an under-use of the operational capabilities of the aircraft. In particular:
controlled manually, the speed of the aircraft is less than it could be if it were controlled automatically, because the pilot generally prefers to be prudent and be well in control of its speed. Consequently, the overall speed of the convoy is lower;

in terms of distance between aircraft within a convoy, the pilot, out of prudence, gives himself wide safety margins, which could be calculated much more precisely if the speed were being followed automatically; and in cases of poor visibility conditions, this convoy-following maneuver is difficult (even impossible) and potentially hazardous in manual piloting mode.

The object of the present invention is to remedy the above-mentioned drawbacks. It relates to a method of generating a controlled speed for a following aircraft taxiing on the ground in a convoy of aircraft, said convoy of aircraft comprising a coherent set of at least two aircraft which follow one another along a common trajectory, namely a lead aircraft, called leader aircraft or leader, and at least one aircraft that follows it, called following aircraft.

To this end, according to the invention, said method is noteworthy in that the following successive steps are performed automatically and repetitively:

a) the current values of first parameters corresponding to parameters of at least one followed aircraft of said convoy, which precedes said following aircraft in said convoy, are received;

b) at least one longitudinal separation which must be observed between said followed aircraft and said following aircraft is generated;

c) the current values of second parameters which correspond to parameters of said following aircraft are measured; and d) using said current values of the first and second parameters and said longitudinal separation, a controlled speed is calculated which represents a longitudinal speed instruction enabling the following aircraft to taxi along a trajectory common to said convoy while maintaining said longitudinal separation relative to said followed aircraft.

Thus, thanks to the invention, a controlled speed is obtained for an aircraft, in particular a transport airplane, which enables it to taxi on the ground in a convoy of aircraft along a trajectory common to said aircraft, while observing at least one longitudinal separation relative to at least one aircraft of the convoy that precedes it.

In a simplified embodiment, in the step b), a fixed value is received for said longitudinal separation.

Furthermore, in a second preferred embodiment, in the step b), said longitudinal separation Di is calculated using the following expression:

$$Di = di + f(vi)$$

in which:

di is a fixed distance to be observed between the followed aircraft and the following aircraft;

vi is the current speed of the following aircraft; and $f(vi)$ is a parameter that varies according to a function f that increases in relation to said current speed vi of the following aircraft Moreover, in a first variant embodiment, in the step d), the controlled speed $v_i$ is calculated using the following expression:

$$v_i = \frac{1 - \tilde{y}_i c(s_i)}{\cos(\tilde{\psi}_i)} \left( \frac{v_{i-1} \cos(\tilde{\psi}_{i-1})}{1 - \tilde{y}_{i-1} c(s_{i-1})} + k_i e_i^{i-1} \right)$$

in which:

$\tilde{y}_i$: is the lateral separation for an aircraft of rank i;

$\tilde{y}_{i-1}$: is the lateral separation for an aircraft of rank i-1;

$v_i$: is the longitudinal speed for the aircraft of rank i;

$v_{i-1}$: is the longitudinal speed for the aircraft of rank i-1;

$c(s_i)$ is the curvature at a current point for the aircraft of rank i;

$c(s_{i-1})$: is the curvature at the current point for the aircraft of rank i-1;

$\tilde{\psi}_i$: is the angular separation for the aircraft of rank i;

$\tilde{\psi}_{i-1}$: is the angular separation for the aircraft of rank i-1;

cos: is the cosine;

$e_i^{i-1}$: is an error; and $k_i$: is a gain.

In a particular variant of this first variant embodiment, the above expression is applied by replacing the parameters associated with the aircraft of rank i-1 with similar parameters associated with the leader aircraft of rank 1.

Furthermore, in a second variant embodiment, in the step d), the controlled speed $v_i$ is calculated using the following expression:

$$v_i = \frac{1 - \tilde{y}_i c(s_i)}{\cos(\tilde{\psi}_i) \left[ 1 + A(z_i) \left( \frac{s_1 - s_{i-1} - }{\sum_{n=1}^{i-1} D_n} \right) \right]} \left( \begin{array}{c} \sigma_i \frac{v_i \cos(\tilde{\psi}_i)}{1 - \tilde{y}_1 c(s_i)} + \\ \left[ \begin{array}{c} 1 - \sigma_i + \\ A(z_i) \left( s_1 - s_{i-1} - \sum_{n=1}^{i-1} D_n \right) \end{array} \right] \\ \frac{v_{i-1} \cos(\tilde{\psi}_{i-1})}{1 - \tilde{y}_{i-1} c(s_{i-1})} + k_i c_i \end{array} \right)$$

in which:

$\tilde{y}_i$: is the lateral separation for an aircraft of rank i;

$\tilde{y}_{i-1}$: is the lateral separation for an aircraft of rank i-1;

$v_i$: is the longitudinal speed for the aircraft of rank i;

$v_{i-1}$: is the longitudinal speed for the aircraft of rank i-1;

$c(s_i)$: is the curvature at a current point for the aircraft of rank i;

$c(s_{i-1})$: is the curvature at the current point for the aircraft of rank i-1;

$\tilde{\psi}_i$: is the angular separation for the aircraft of rank i;

$\tilde{\psi}_{i-1}$: is the angular separation for the aircraft of rank i-1;

$s_{i-1}$: is the curvilinear abscissa for an aircraft of rank i-1;

$s_1$: is the curvilinear abscissa for the leader aircraft;

$\tilde{\psi}_1$: is the angular separation for the leader aircraft;

$v_1$: is the longitudinal speed for the leader aircraft;

$c(s_1)$: is the curvature at the current point of the leader aircraft;

$A(z_i)$: is a quantity;

$\sigma_i$: is a regulation parameter;

$\tilde{y}_1$: is the lateral separation for the leader aircraft;

$k_i$: is a gain;

ci: is an appropriate set point; and $D_i$: is the longitudinal separation between a leader aircraft of rank i-1 and an aircraft of rank i.

In this second variant embodiment, advantageously, in the step d), said gain $k_i$ is determined so as to avoid a saturation in speed and in acceleration. Furthermore, advantageously, in the step d), acceleration is monitored, so as to enable the deceleration authority of the following aircraft to be widened in case of risk of collision with a followed aircraft.

The present invention also relates to an automatic longitudinal guidance method for a following aircraft taxiing on the ground in a convoy of aircraft.

This method is noteworthy, according to the invention, in that the following series of successive operations is performed automatically and repetitively:

A/ a controlled speed is generated, implementing the above-mentioned method;

B/ set points are calculated that are likely to be applied to control means that act on the speed of the aircraft, said set points being such that, when applied to said control means, the latter pilot the aircraft longitudinally according to said controlled speed; and C/ the duly calculated set points are applied to said control means.

The present invention also relates to a device for generating a controlled speed for a following aircraft taxiing on the ground in a convoy of aircraft.

According to the invention, said device comprises:
means for receiving the current values of first parameters corresponding to parameters of at least one followed aircraft of said convoy, that precedes said following aircraft in said convoy;
means for generating at least one longitudinal separation which must be observed between said followed aircraft and said following aircraft;
means for measuring the current values of second parameters which correspond to parameters of said following aircraft; and
means for calculating, using said current values of the first and second parameters and said longitudinal separation, a controlled speed which represents a longitudinal speed instruction enabling the following aircraft to taxi along a trajectory common to said convoy while maintaining said longitudinal separation relative to said followed aircraft.

This device can be incorporated in an automatic longitudinal guidance system for an aircraft taxiing on the ground, which comprises, according to the invention, in addition to said device which is designed to generate a controlled speed:
control means which act on the speed of the aircraft;
means for calculating set points likely to be applied to said control means, said set points being such that, when applied to said control means, the latter pilot the aircraft longitudinally according to said controlled speed; and
means for applying the duly calculated set points to said control means.

The present invention also relates to an aircraft, in particular a transport airplane, civilian or military, that includes a device and/or a system such as those mentioned above.

The present invention therefore relates to an automatic longitudinal guidance of an aircraft taxiing on the ground, making it possible to generate a speed instruction so as to maintain one or more separations, in time or in distance, that are constant or variable, with one or more other aircraft that are part of a convoy moving in an airport area.

It makes it possible to accurately regulate one or more given separations, set, for example, by ground control, with one or more other aircraft in the convoy. Manually locking the aircraft (that is, doing so when the human pilot is controlling the aircraft) to such separations is not very accurate, represents a major workload for the pilot, and is difficult to perform, particularly in cases of degraded visual or atmospheric conditions. When the locking is performed automatically by the abovementioned said device and said system, the pilot is relieved of all the workload corresponding to the manual piloting of the aircraft, which enables him to focus on other tasks, in particular monitoring the external environment (movements of other vehicles, surrounding obstacles), communications with air traffic/ground control, and so on. Furthermore, this automatic locking can be performed with degraded visual conditions (for example at night) or atmospheric conditions (for example: rain, mist, snow), which would make manual piloting of the following of the convoy difficult or impossible.

When all the aircraft of the convoy are piloted automatically by such a device (and such a system), the convoy has a deterministic length (that is, a length set by ground control and known in advance) in normal regulation conditions (that is, excluding transitional phases, for example when an aircraft joins or leaves the convoy), which facilitates the management and increases the traffic flow on the ground.

Automating the control of the speed makes it possible to choose separations between aircraft that are smaller than in manual piloting mode, which makes it possible to create denser convoys of aircraft, in which the aircraft are more grouped together. It is therefore possible to form longer convoys than in manual piloting mode (that is, consisting of more aircraft), or, given the same number of aircraft, form shorter convoys.

The invention makes it possible to determine the maximum speed of the convoy, according to the capabilities of each of the members of the convoy. Consequently, it makes it possible to increase the overall speed of the convoy. By authorizing higher speeds for each of the aircraft in the convoy compared to manual piloting, it makes it possible to maximize the overall speed capabilities of the convoy.

The invention makes it possible to ensure the safety and the stability of the convoy:
regarding safety, it makes it possible to choose a minimum safety separation (between aircraft), and thereby guarantee that the separations with the other aircraft will not be less than this safety separation. Consequently, the invention provides an anti-collision function on the ground with respect to the other members of the convoy, and therefore prevents close contact-type accidents with other aircraft; and
regarding stability, it makes it possible to ensure the stability of the convoy (no divergence of overall behavior of the convoy, for example, excessive or sustained accordian-type oscillations), and does so regardless of changes in speed of the leader aircraft or other aircraft.

The figures of the appended drawing will allow a clear understanding of how the invention can be implemented. In these figures, identical references designate similar elements.

FIG. 1 is the block diagram of a device according to the invention for generating a controlled speed for an aircraft taxiing in a convoy of aircraft.

Figure 2:
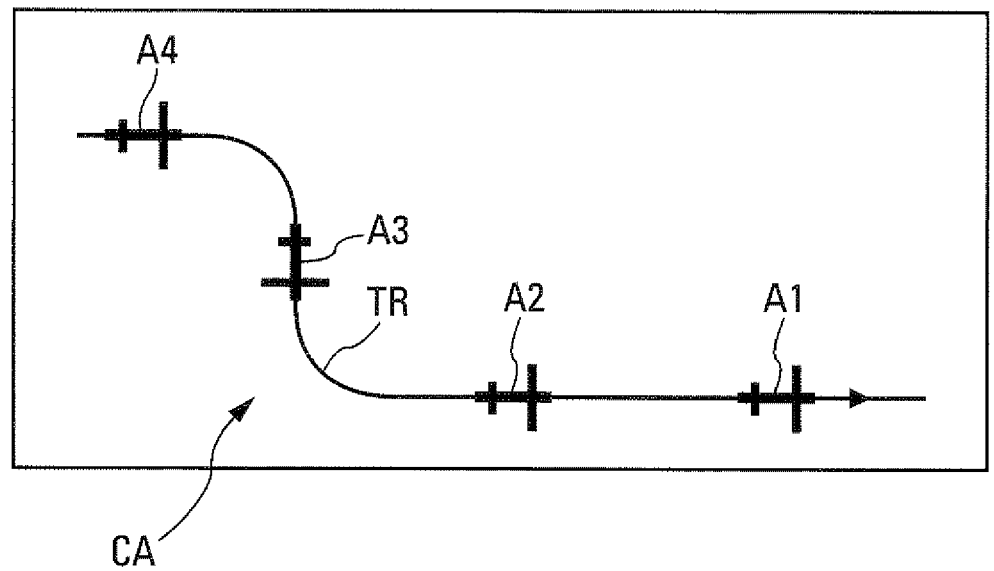

FIG. 2 diagrammatically illustrates a convoy of aircraft.

Figure 3:
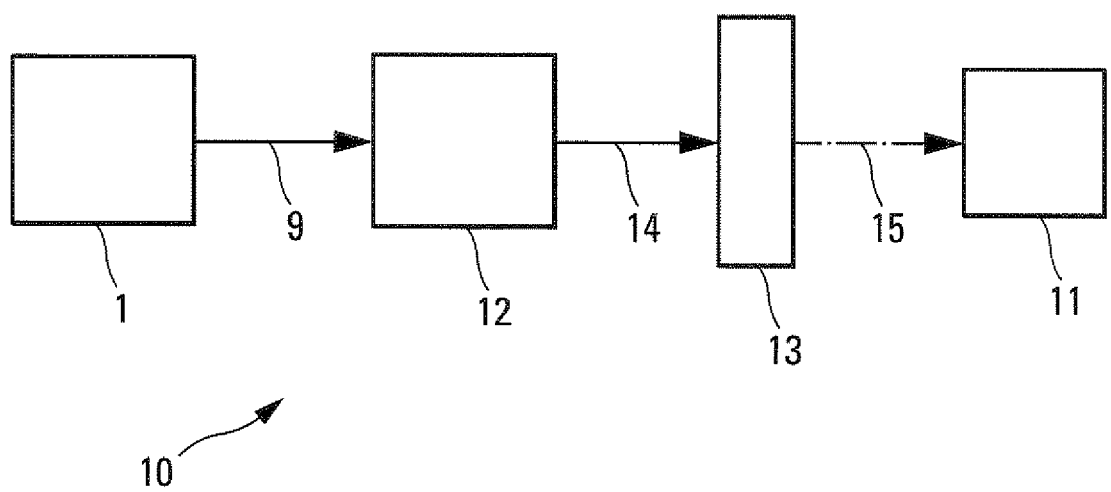

FIG. 3 is the block diagram of an automatic longitudinal guidance system for an aircraft, which comprises a device according to the invention.

Figure 4:
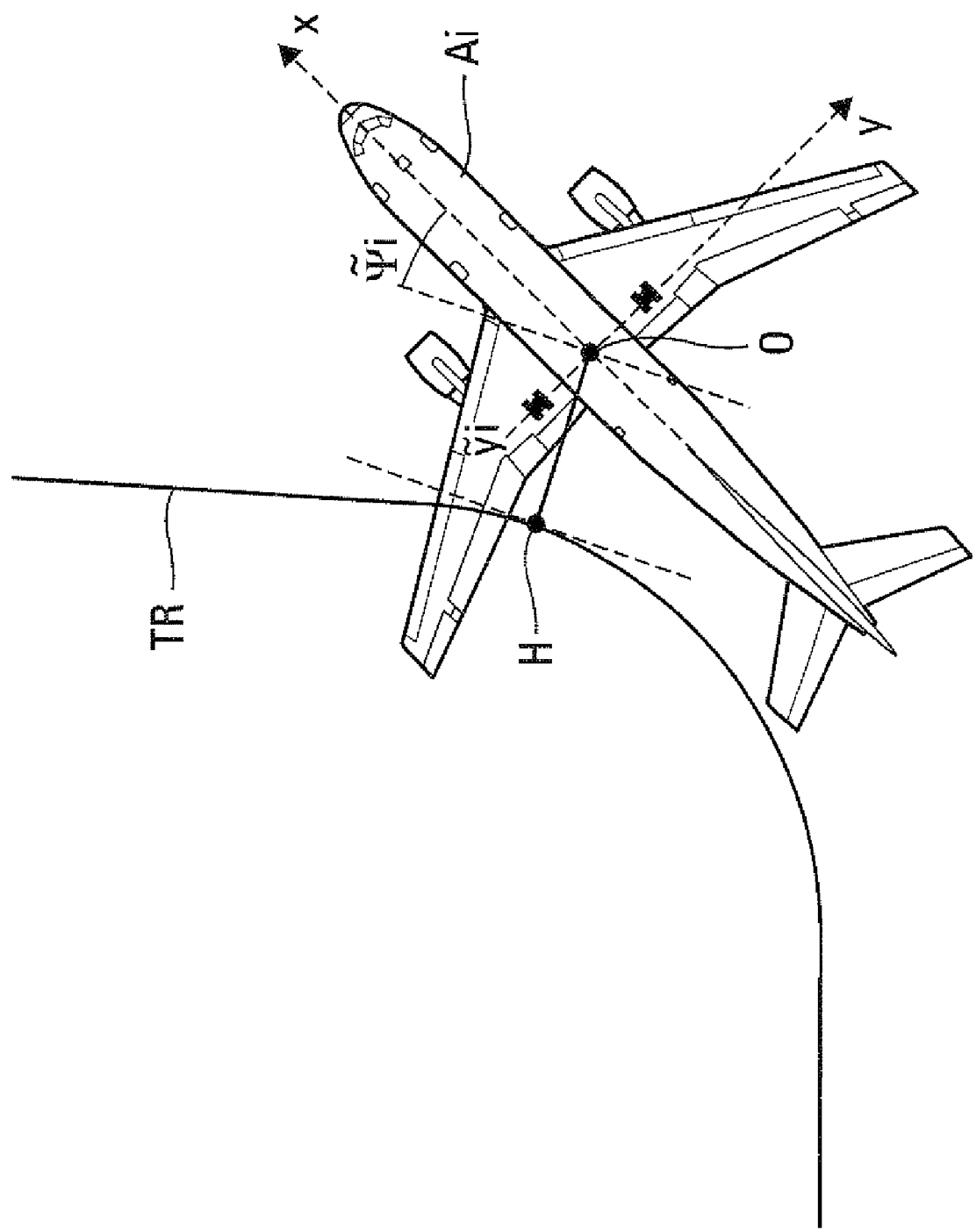

FIG. 4 diagrammatically illustrates, in plan view, the taxiing on the ground of an aircraft along a common trajectory followed by a convoy of aircraft.

Figure 5:
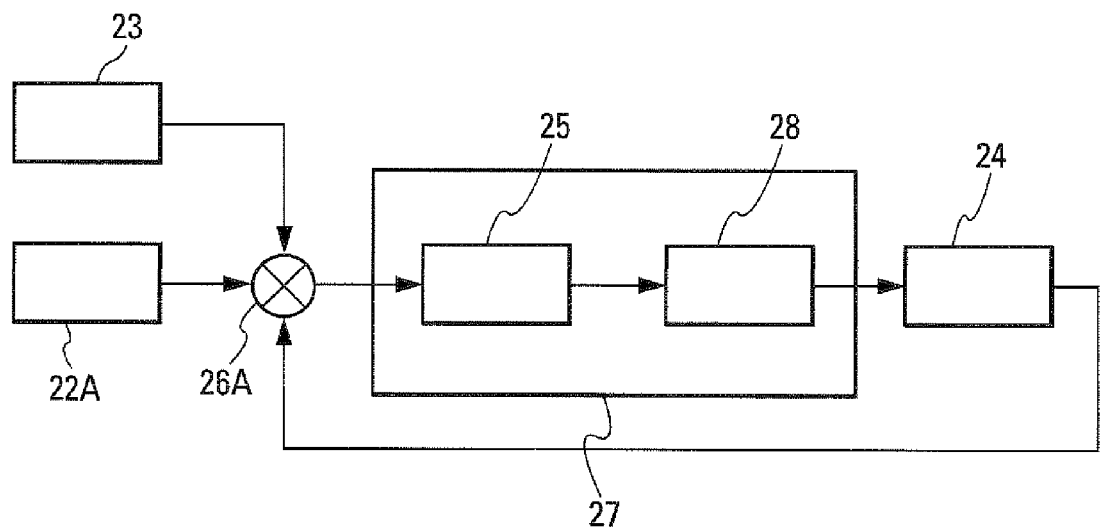

FIG. 5 is the block diagram of a first embodiment of the invention.

Figure 6:
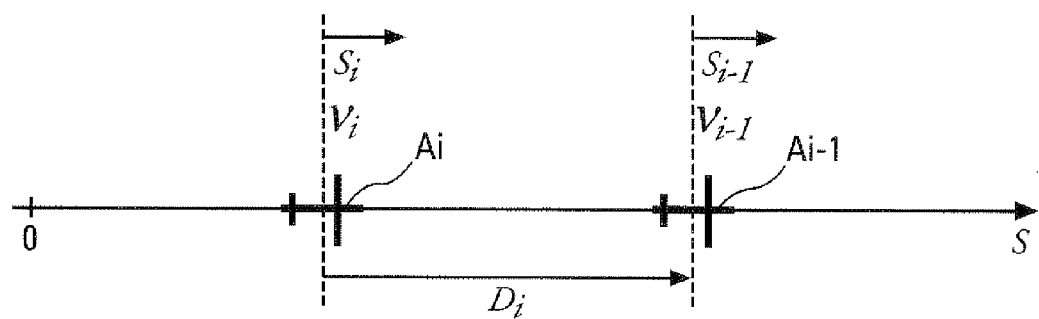

FIG. 6 diagrammatically illustrates a distance to be regulated when implementing the embodiment of FIG. 5.

Figure 7:
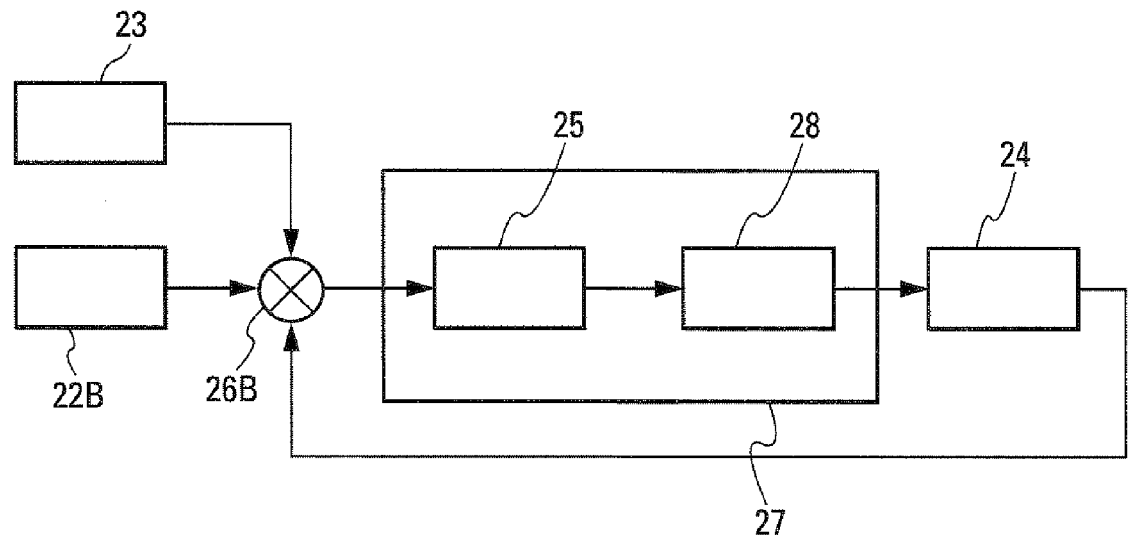

FIG. 7 is the block diagram of a second embodiment of the invention.

Figure 8:
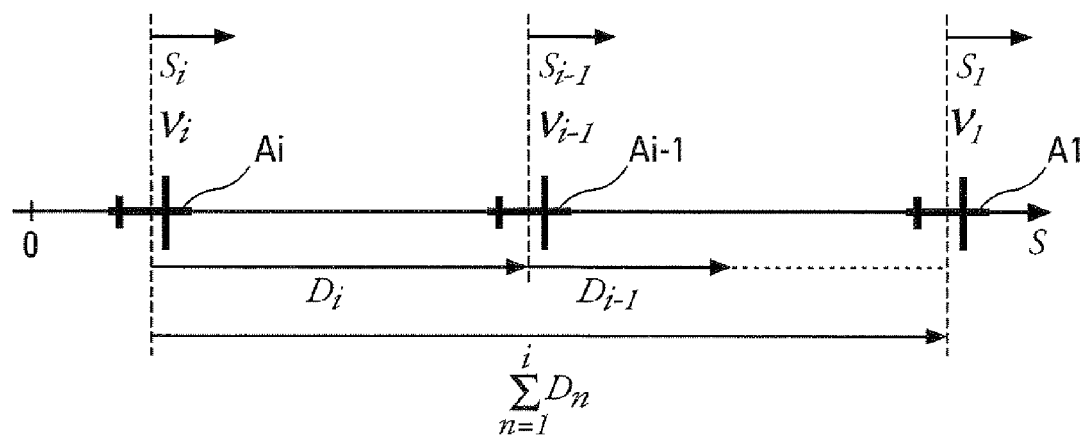

FIG. 8 diagrammatically illustrates a distance to be regulated when implementing the embodiment of FIG. 7.

Figure 9:
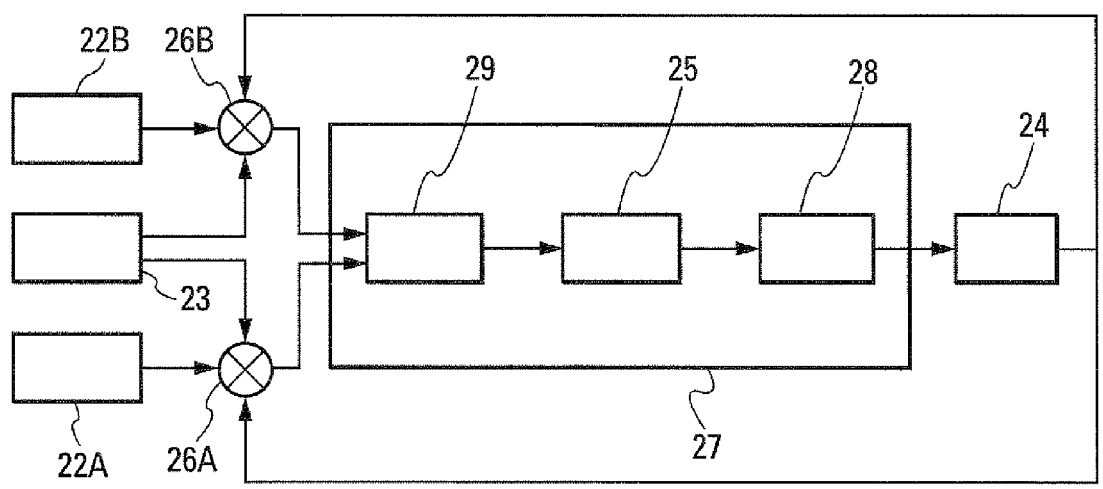

FIG. 9 is the block diagram of a third embodiment of the invention.

Figure 10:
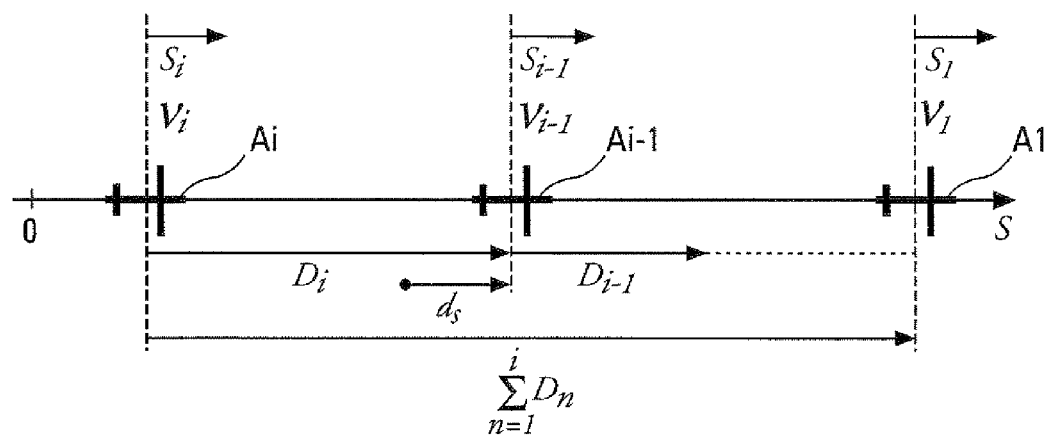

FIG. 10 diagrammatically illustrates a distance to be regulated when implementing the embodiment of FIG. 9.

Figure 11:
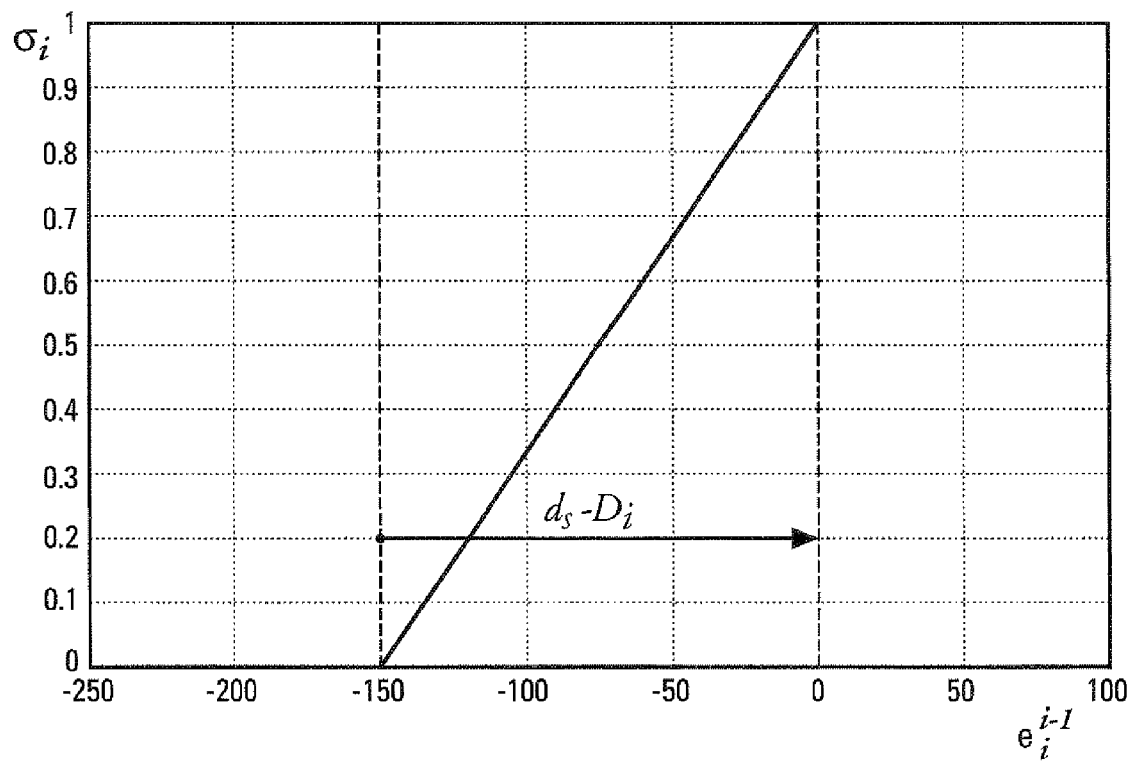
Figure 12:
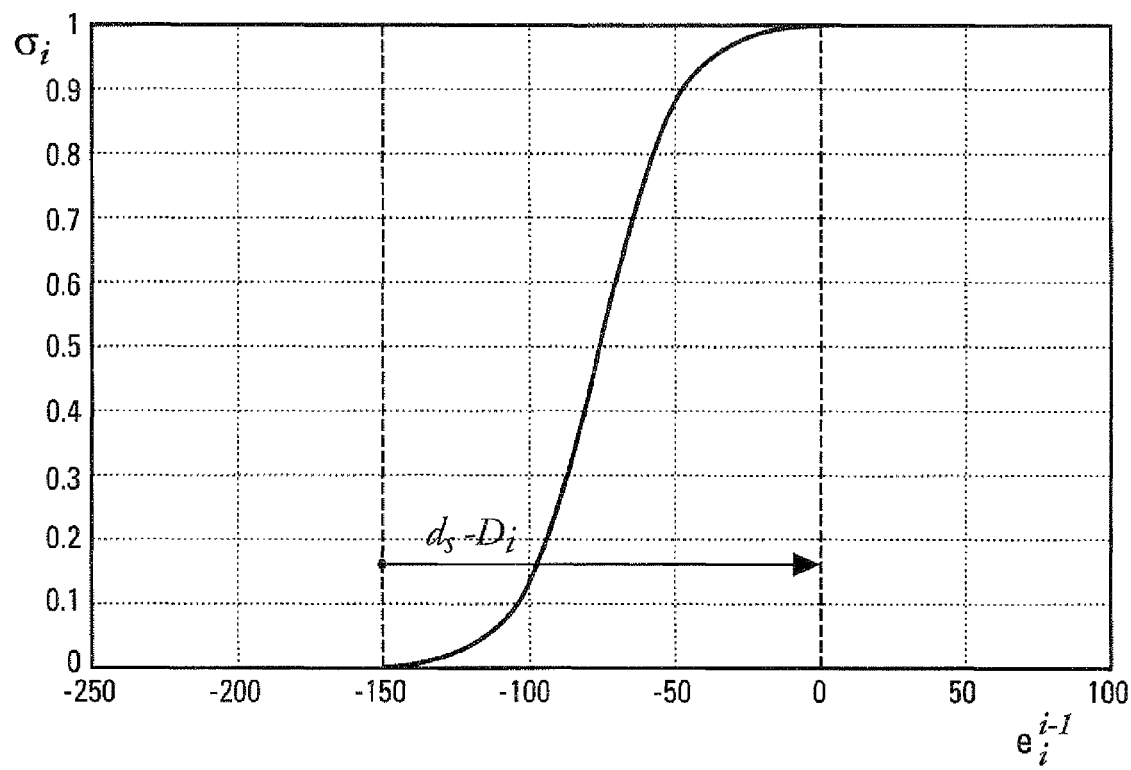
Figure 13:
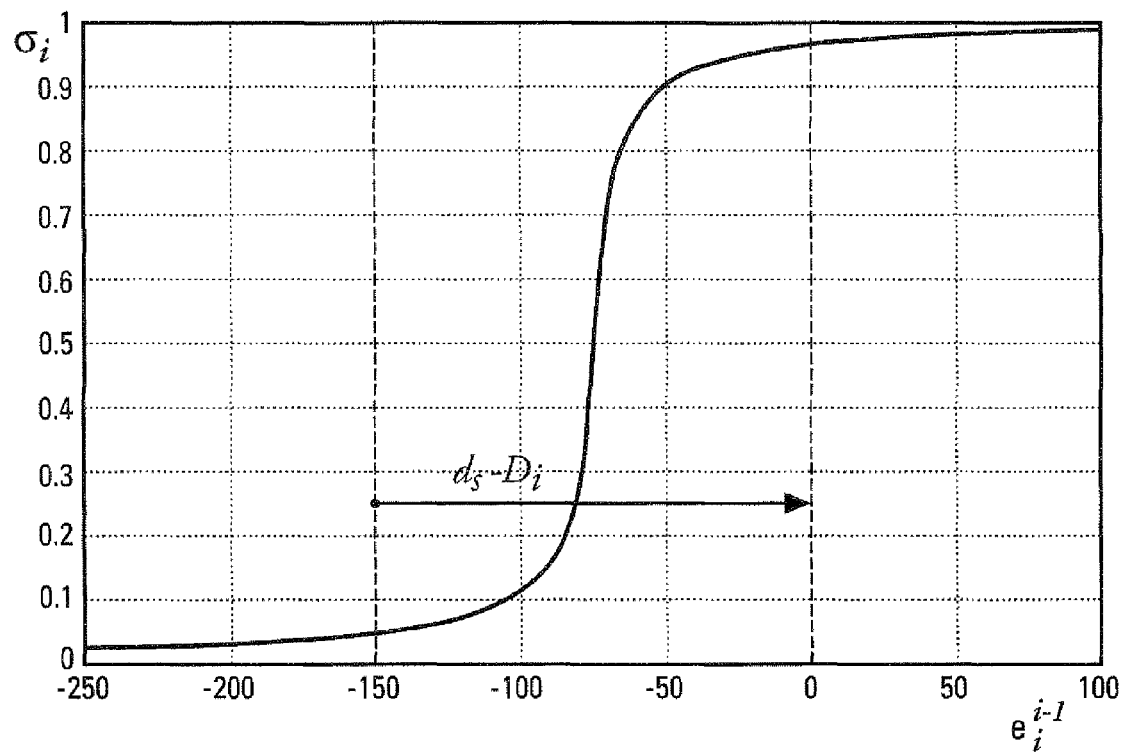

FIGS. 11 to 13 are graphs that diagrammatically show various possible variants of a parameter making it possible to regulate the predominance between two different approaches.

The device 1 according to the invention and diagrammatically represented in FIG. 1 is designed to generate a controlled speed for an aircraft, in particular a transport airplane, which is taxiing on the ground in a convoy of aircraft along a trajectory TR for taxiing on the ground (as represented in FIG. 4), which is common to the aircraft of the convoy, while observing at least one separation specified hereinbelow.

In the context of the present invention, a convoy of aircraft CA is considered to be a coherent set of at least two aircraft A1, A2, A3, A4 following one another in single file, along a common trajectory TR for taxiing on the ground, as represented in FIG. 2. This set is considered to be coherent if the aircraft A1 to A4 of the convoy CA exchange, between themselves and with ground control, information making it possible to follow the trajectory TR on the ground, according to a behavior (in particular in terms of speed and/or acceleration) that is suited to the stability and the safety of the convoy. This convoy CA therefore comprises a leader aircraft A1 which is also called leader and one or more aircraft A2, A3, A4 that follow this leader aircraft A1 and that are called following aircraft. The different aircraft A1 to A4 of the convoy CA must notably observe between them particular separations, expressed in distance or in time, as specified hereinbelow.

According to the invention, said device 1 which is on board a following aircraft A2 to A4 of the convoy CA, comprises, as represented in FIG. 1 data reception means 2, for receiving the current values of first parameters corresponding to parameters (such as the speed, position and/or heading) of at least one (followed) aircraft of said convoy CA, which precedes said following aircraft in said convoy and is therefore followed by the latter;

means 3 for generating at least one longitudinal separation which must be observed between said followed aircraft and said following aircraft equipped with said device 1;

means 4 for measuring, in the usual manner, on the following aircraft, the current values of second parameters which correspond to parameters of said following aircraft, and in particular its speed, position and heading; and means 5 which are linked via links 6, 7 and 8 respectively to said means 2, 3 and 4 and which are formed in such a way as to calculate, using said current values of the first and second parameters and said longitudinal separation, a controlled speed which represents a longitudinal speed instruction making it possible to have the following aircraft taxi along a trajectory TR common to said convoy CA, while maintaining said separation relative to said followed aircraft, said controlled speed possibly being transmitted via a link 9 to user means (not represented in FIG. 1).

In a particular embodiment:

said means 2 are part of a data transmission system which can cooperate in particular with the aircraft which directly precedes said following aircraft and/or with the leader aircraft A1 of the convoy CA. This system preferably cooperates with all the aircraft of the convoy. The aircraft of the convoy exchange the measured parameter values between themselves; and said means 3 can comprise information reception means, which receive from outside the aircraft, in particular from a control station situated on the ground, a variety of information and in particular said separation to be maintained.

Thus, in the context of the present invention, two levels of information exchange are provided that are necessary to the correct operation of the convoy CA:

"low-level" information, for example the position, speed and heading of each aircraft, is sent directly to the other aircraft. The information is shared between the aircraft, in order to ensure the individual behaviors of the convoy (individual displacements of the aircraft). On an aircraft scale, this data ensures the stability and the safety of the convoy; and "high-level" information (status of the convoy) is centralized at ground control level which is better able to manage the overall behavior of the convoy (scheduling, departures and arrivals of aircraft in the convoy, etc.). On the convoy CA scale, this data ensures the coherence of the latter.

In a preferred application, said device 1 is part of a system 10 which is designed for the automatic longitudinal guidance of the aircraft taxiing on the ground in a convoy of aircraft along the trajectory TR.

As represented in FIG. 3, this onboard system 10 comprises, in addition to said device 1:

control means 11, for example engines and/or brakes, which act on the (longitudinal) speed of the aircraft;

means 12 which are linked to said device 1 and which are designed to calculate set points likely to be applied to said control means 11. These set points are such that, when applied to said control means 11, the latter control the aircraft according to said controlled speed received from said device 1 via the link 9; and usual means 13, for example engine or brake actuators, which are linked via a link 14 to said means 12 and which are formed in such a way as to apply, in the usual manner, the set points calculated by said means 12 to said control means 11, as illustrated by a chain-dotted line link 15.

In the context of the present invention, the place of each aircraft within the convoy CA is given by its rank i:

for a convoy of n aircraft A1, A2, . . . , An, there are:

$$i \in [1,n]$$

the lead aircraft A1 (or leader aircraft) is of rank i=1. Said aircraft acts independently (from the point of view of its speed) relative to the rest of the convoy; and following aircraft A2 to An, of rank i∈[2,n], lock their speed onto the lead aircraft and the rest of the convoy, so as to maintain separations (in time or in distance) that are constant (or not) between the various members of the convoy. These separations to be observed can vary from one rank to another.

The rank of the various aircraft that make up the convoy is given by ground control, which manages the scheduling of the convoy.

In the context of the present invention, a status vector of an aircraft Ai is used, which presents the following characteristics:

$$\begin{bmatrix} s_i \\ v_i \\ \tilde{y}_i \\ \tilde{\psi}_i \\ c(s_i) \\ N_i \end{bmatrix}$$

with $s_i$: the curvilinear abscissa over a trajectory element $N_i$;

$v_i$: the longitudinal speed;

$\tilde{y}_i$: a lateral separation represented in FIG. 4;

$\tilde{\psi}_i$: an angular separation also represented in FIG. 4;

$c(s_i)$: the curvature of the trajectory at a target point H; and $N_i$: the current element of the trajectory TR.

In FIG. 4, O is a point of an aircraft Ai, called control point (for example, the wheel of the front landing gear, the center of gravity of the aircraft Ai or the median point of the main landing gears), of which the projection H along the trajectory TR is called target point. The position of the target point H along the trajectory TR is expressed in the form of a curvilinear abscissa $s_i$. In FIG. 4, $\tilde{y}_i$ is the distance between H and O, $\tilde{\psi}_i$ is the angular separation between the heading of the aircraft Ai and the tangent to the trajectory at H, and Oxy is a horizontal plane.

The object of the longitudinal control (implemented by the device 1) is to regulate a spacing, constant or variable, according to certain parameters (speed, for example), between the aircraft. The longitudinal set point can be expressed as a distance between aircraft, or as a relative time between aircraft such that their spacing increases with speed, or as a hybrid set point combining a distance between aircraft and a relative time.

Given the low range of ground taxiing speeds (from 0 to 30 knots approximately), it may be chosen to regulate a distance between aircraft that is fixed, or even a hybrid distance/time set point.

Thus, between the aircraft Ai-1 and Ai of respective ranks i-1 and i, the regulation set point Di can be a distance, given by the following expression:

$$Di = di + f(vi)$$

in which:
  di is a fixed distance to be observed between the aircraft of rank i-1 and the aircraft of rank i, when the speed is close to zero. This distance can be chosen to be identical for all the separations, or else to be a function of certain parameters. For example, if the aircraft Ai is a very large carrier airplane, the distance di is chosen to be greater than where the aircraft Ai is a small, business plane of smaller dimensions and lower inertia. Furthermore, if the aircraft Ai does not have the device 1 and the system 10 according to the invention and is piloted manually, the distance from the preceding aircraft Ai-1 must be chosen to be greater, in order to take account of the longer reaction time in manual piloting mode. A minimum value can also be determined for each aircraft and sent to ground control (using appropriate means that are part of the device 1), in order for the latter to choose a value that is compatible with the dimensions and capabilities (braking in particular) of the aircraft Ai; and
  $f$ is an increasing function (for example of linear type) of the speed of the aircraft Ai, which is characteristic of the physical dynamic range of the aircraft for example, and which makes it possible to ensure the safety of the convoy. This function $f$ can be used to provide the association on the ground between a function of ASAS ("Airborne Separation Assurance System") type and a separation on the ground on an area of the runway. As the speed decreases (from approach speed to ground taxiing speed), the separation between aircraft changes from a separation in time ensured by the ASAS function to a separation in distance ensured by the present invention.

This distance Di is preferably provided by ground control.

This distance is assessed in the form of a curvilinear distance, which is calculated along the reference trajectory TR. This is because, given the high curvatures of the trajectories on the ground, the Euclidian distance (direct distance) is not representative of the distance between the aircraft for the purposes of convoy control.

The objective of the longitudinal control (implemented by the device 1) is to ensure the speed control of the members of the convoy, so as to observe a given set point for the separation between the aircraft, in the form of a distance. This distance is denoted $Di = s_{i-1} - s_i$. It is counted as curvilinear abscissa s, between the aircraft of rank i-1 and the aircraft of rank i.

For a convoy CA consisting of n aircraft, each aircraft is indexed, from 1 for the lead aircraft to n for the tail aircraft of the convoy, according to its rank within the convoy CA.

In the context of the present invention, three different embodiments are provided for:
  in a first embodiment represented in FIG. 5, the device 1 implements a local "step by step" control (the guidance law of the current aircraft Ai is based only on the information from the aircraft Ai-1 which precedes it);
  in a second embodiment represented in FIG. 7, the device 1 implements a leader-referenced control (the guidance law of the current aircraft Ai is based only on the information from the lead aircraft A1); and
  in a third (preferred) embodiment represented in FIG. 9, the device 1 implements an overall control law summarizing the preceding two approaches. In this preferred embodiment, the device 1 also implements a speed and acceleration monitoring function.

In the first embodiment, the device 1 therefore implements a "step-by-step" local control. The guidance law involves controlling each aircraft according to the behavior of the aircraft immediately preceding it. The objective of this control is therefore to regulate a constant separation (at given speed), denoted $D_i$, between the $(i-1)^{th}$ aircraft Ai-1 and its direct follower, the $i^{th}$ aircraft Ai.

This first type of control is illustrated by FIG. 5, in which are represented:
  a means 23 for generating the distance Di;
  a means 22A for receiving the curvilinear abscissa of the aircraft Ai-1 of rank i-1;
  a means 24 for receiving the curvilinear abscissa of the aircraft Ai of rank i;
  a means 26A for taking account of these various parameters and transmitting them to a longitudinal control means 27 of the aircraft Ai of rank i; and
  said means 27 which comprises a means 25 for calculating the controlled speed and a means 28 for monitoring the thus calculated controlled speed, before applying it to the aircraft of rank i (means 24).

To construct the longitudinal control law, an error, in terms of distance, is first of all introduced:

$$e_j^{i-1} = s_{i-1} - s_i - D_i$$

This distance error is negative if the aircraft of rank i is too close to the aircraft of rank (i-1), and is positive if it is too distant.

FIG. 6 shows the distance to be regulated between the preceding aircraft Ai-1 of rank i-1 and the current aircraft Ai of rank i.

The step-by-step longitudinal control can be defined by the following relation:

$$v_i = \frac{1 - \tilde{y}_i c(s_i)}{\cos(\tilde{\psi}_i)} \left( \frac{v_{i-1} \cos(\tilde{\psi}_{i-1})}{1 - \tilde{y}_{i-1} c(s_{i-1})} + k_i e_i^{i-1} \right)$$

The desired response time can be imposed, by choosing $k_i$ as follows:

$$k_i = \frac{3}{t_{5\%}}$$

in which $t_{5\%}$ is the 5% response time of the regulation system following a disturbance. This value is determined empirically, for example according to the speed and acceleration capabilities of the aircraft.

The essential advantage of this longitudinal guidance law is that it makes it possible to ensure the safety of the convoy, while observing the separation between each aircraft. It therefore acts as an anti-collision system within the convoy. It makes it possible to avoid the longitudinal close contact of an aircraft Ai of the convoy with the aircraft Ai-1 preceding it, lateral close contact being in principle impossible since all the aircraft in the convoy follow the same trajectory TR. Consequently, the local approach ensures the safety of the convoy.

In the second embodiment represented in FIG. 7, the device 1 implements a leader-referenced control. The guidance law of the following aircraft Ai is based only on the information from the leader aircraft A1. This approach, in the control, takes account of the convoy as a whole. The proposed method involves realigning the aircraft of the convoy relative to one another. Since each member of the convoy is able to serve this purpose, it is arbitrarily assigned to the leader A1 of the convoy. This choice is natural, because the leader A1 plays a particular role in the convoy: if the leader is driven by a human pilot or an automatic pilot, all the dynamic range of the convoy is dictated by the leader, which is not subject to the controls developed in this embodiment.

This objective of this control is therefore that the following aircraft A2 to An should observe a certain separation, associated with their position in the convoy, with the leader aircraft A1.

FIG. 7 is similar to FIG. 5. Simply put, the means 22A which relates to the preceding aircraft of rank i-1 is replaced by a means 22B which relates to the leader aircraft of rank 1, and the means 26A is replaced by a similar means 26B.

The set point to be reached can be formally expressed as follows: the $i^{th}$ aircraft Ai of the convoy CA must maintain a distance with the leader A1 which is equal to the sum of the separations $D_i$ between the lead aircraft A1 and the aircraft Ai. These separations to be maintained being a priori different from one aircraft to another (according to its dimensions, whether it is piloted manually or not, the condition of the runway, etc.), the distance to be maintained can be defined by the following sum:

$$\sum_{n=1}^{i} D_n$$

By convention, $D_1$ is the distance between the lead aircraft and itself. Consequently, $D_1=0$.

FIG. 8 shows the distance to be regulated between the leader b aircraft A1 of rank 1 and the current aircraft Ai of rank i.

The control error is therefore:

$$e_i^1 = s_1 - s_i - \sum_{n=1}^{i} D_n$$

The step-by-step longitudinal control can be defined by the following relation:

$$v_i = \frac{1 - \tilde{y}_i c(s_i)}{\cos(\tilde{\psi}_i)} \left( \frac{v_1 \cos(\tilde{\psi}_1)}{1 - \tilde{y}_1 c(s_1)} + k_i e_i^1 \right)$$

The desired response time can be imposed, by choosing $k_i$ as follows:

$$k_i = \frac{3}{t_{5\%}}$$

where $t_{5\%}$ is the 5% response time of the regulation system following a disturbance. This value is to be determined empirically, as a function, for example, of the speed and acceleration capabilities of the aircraft.

The preceding leader-referenced approach ensures the stability of the convoy and a level of comfort for the passengers, which is better than with the local control (step-by-step), and above all identical regardless of the place of the aircraft in the convoy.

In the third embodiment represented in FIG. 9, which is the preferred embodiment, the device 1 implements an overall control law summarizing the preceding two approaches. The objective of the longitudinal regulation of each aircraft takes into account not only the separation with the preceding aircraft, which is essential for avoiding collisions (close contact), but also the separation with the lead aircraft. This makes it possible, on the one hand, to ensure the safety of the convoy and, on the other hand, to be able to transmit a change of pace from the lead aircraft simultaneously to each aircraft of the convoy.

In addition to the means detailed hereinabove with reference to FIGS. 5 and 7, the device of FIG. 9 also includes a means 29 for determining a suitable set point.

In order to give more or less importance to one or other of the errors, and therefore more or less influence to the associated approach, the suitable set point, denoted $c_i$, is constructed as follows:

$$c_i = \sigma_i e_i^1 + (1-\sigma_i) e_i^{i-1}$$

with:

$$\begin{cases} e_i^1 = s_1 - s_i - \sum_{n=1}^{i} D_n \\ e_i^{i-1} = s_{i-1} - s_i - D_i \end{cases}$$

FIG. 10 shows the distance to be regulated between the leader aircraft A1, the preceding aircraft Ai-1 and the current aircraft Ai.

The parameter $\sigma_i$, defined between 0 and 1, makes it possible to regulate the predominance of one or other of the approaches. The next step consists in judiciously defining $\sigma_i$, so as to quantify this influence.

A parameter $d_s$ is first defined as the minimum curvilinear safety distance that must always be observed between any two aircraft. This limit is less than the regulation set point $D_i \forall v_i$ and $\forall i$, therefore $d_s < d_i \forall i$:

if the separation is close to $d_s$, the error $e_i^{i-1}$ is close to $d_s - D_i$. In this case, $\sigma_i$ is close to 0; and if the separation is in the vicinity of or greater than $D_i$, the error $e_i^{i-1}$ is in the vicinity of 0 or positive. In this case, $\sigma_i$ is close to 1.

The distances $d_s$, $d_i$ and $D_i$ are determined empirically, for example as a function of the dimensions of the aircraft that make up the convoy, the condition of the runway, the maximum speed of the convoy, and/or regulations.

Various definitions of transitions $\sigma_i$ can be envisaged. Three different variants are presented below, namely:
a linear transition;
a sigmoidal transition (preferred variant); and
a pseudo-sigmoidal transition.

In a first variant, the preceding conditions are formulated by using a linear transition:

$$\begin{cases} \sigma_i(z_i) = 0 \text{ if } z_i \leq d_s - D_i \\ \sigma_i(z_i) = 1 \text{ if } z_i \geq 0 \\ \sigma_i(z_i) = \frac{z_i + (D_i - d_s)}{(D_i - d_s)} \text{ if } 0 \geq z_i \geq d_s - D_i \end{cases}$$

with:

$$z_i = e_i^{i-1}$$

FIG. 11 gives an example of this function $\sigma_i(z_i)$, with $d_s - D_i = -150\text{m}$:
if the error $e_i^{i-1}$ is positive or zero, $\sigma_i = 1$;
if the error $e_i^{i-1}$ is less than $d_s - D_i = -150\text{m}$, $\sigma_i = 0$; and
if the error $e_i^{i-1}$ is between $d_s - D_i$ and 0, $\sigma_i$ varies continually (linearly) from 0 to 1.

In a second embodiment, which is the preferred embodiment, these conditions are formulated on the basis of a sigmoid function of the form:

$$\sigma_i(z_i) = \frac{1}{1 + e^{-az_i}} \text{ with } a > 0$$

The variable of the sigmoid function is chosen as follows:

$$z_i = e_i^{i-1} + \frac{D_i - d_s}{2}$$

FIG. 12 gives an example of this function $\sigma_i(z_i)$, with $d_s - D_i = -150\text{m}$:
if the error $e_i^{i-1}$ is positive or zero, $\sigma_i = 1$;
if the error $e_i^{i-1}$ is less than $d_s - D_i = -150\text{m}$, $\sigma_i = 0$; and
if the error $e_i^{i-1}$ is between $d_s - D_1$ and 0, $\sigma_i$ varies continually from 0 to 1.

The parameter $a$ can be determined by the following relation:

$$a = \frac{12}{D_i - d_s}$$

In a third embodiment, a transition similar to the sigmoid is used, but one that is simpler to implement on the aircraft, because it makes it possible to dispense with the exponential function. The function $\sigma_i$ then takes the form:

$$\sigma_i(z_i) = \frac{az_i}{2(1 + |az_i|)} + 0.5 \text{ with } a > 0$$

with:

$$z_i = e_i^{i-1} + \frac{D_i - d_s}{2}$$

FIG. 13 gives an example of this function $\sigma_i(z_i)$, with $d_s - D_i = -150\text{m}$:
if the error $e_1^{i-1}$ is positive or zero, $\sigma_i$ is close to 1;
if the error $e_i^{i-1}$ is less than $d_s - D_i = -150\text{m}$, $\sigma_i$ is close to 0; and
if the error $e_i^{i-1}$ is between $d_s - D_i$ and 0, $\sigma_i$ varies continually from 0 to 1.

The value of the parameter $a$ is given by the following relation:

$$a = \frac{12}{D_i - d_s}$$

Once the control set point has been determined, the control law can be constructed.

In order to simplify the expressions, a quantity $A(z_i)$ is introduced which verifies:
for the linear transition:

$$A(z_i) = \frac{1}{(D_i - d_s)}$$

if $0 \geq z_i \geq d_s - D_i$, 0 otherwise
for the sigmoid:

$$A(z_i) = \frac{ae^{-az_i}}{(1 + e^{-az_i})^2}$$

for the pseudo-sigmoid:

$$A(z_i) = \frac{a}{2(1 + |az_i|)^2}$$

Thus, $\sigma_{i+1}$ and its derivative can be expressed:
for the linear transition: $\dot\sigma_i = A(z_i)$
for the other transitions: if $$\sigma_i(z_i) = \frac{1}{1 + e^{-az_i}} \text{ or } \sigma_i(z_i) = \frac{az_i}{2(1 + |az_i|)} + 0.5$$

$$\dot\sigma_i = A(z_i)\dot e_i^{i-1}$$

The overall control law is given by the following relation:

$$v_i = \frac{1 - \tilde y_i c(s_i)}{\cos(\tilde\psi_i)\left[1 + A(z_i)\left(s_1 - s_{i-1} - \sum_{n=1}^{i-1} D_n\right)\right]}$$

$$\left(\sigma_i \frac{v_1 \cos(\tilde\psi_1)}{1 - \tilde y_1 c(s_1)} + \left[\begin{array}{c} 1 - \sigma_i + \\ A(z_i)\left(s_1 - s_{i-1} - \sum_{n=1}^{i-1} D_n\right) \end{array}\right]\left|\frac{v_{i-1}\cos(\tilde\psi_{i-1})}{1 - \tilde y_{i-1} c(s_{i-1})} + k_i c_i\right|\right)$$

The choice of the longitudinal gain $k_i$ can be used to impose a 5% response time ($t_{5\%}$) by the following relation:

$$k_i = \frac{3}{t_{5\%}}$$

where $t_{5\%}$ is the 5% response time of the regulation system following a disturbance. This value is determined empirically, as a function, for example, of the speed and acceleration capabilities of the aircraft.

This control renders the convoy CA more stable and more comfortable, while ensuring safety (by observing the distance between aircraft).

It can be seen that, in the case where the convoy CA comprises only two aircraft, the three approaches (step-by-step control, leader-referenced control and overall control) give exactly the same control law, which ensures a continuity of behavior regardless of the number of aircraft in the convoy.

This longitudinal control law requires the following variables, which are all expressed in relation to the trajectory of the current aircraft Ai on which the device 1 according to the invention is installed.

| Variable | Lead aircraft | Preceding aircraft | Current aircraft |
|---|---|---|---|
| Curvilinear abscissa | $s_1$ | $s_{i-1}$ | $s_i$ |
| Longitudinal speed | $v_1$ | $v_{i-1}$ | $v_i$ |
| Lateral separation | $\tilde{y}_1$ | $\tilde{y}_{i-1}$ | $\tilde{y}_i$ |
| Angular separation | $\tilde{\psi}_1$ | $\tilde{\psi}_{i-1}$ | $\tilde{\psi}_i$ |
| Curvature at the current point | $c(s_1)$ | $c(s_{i-1})$ | $c(s_i)$ |

Ideally, and if communications between aircraft allow, each aircraft in the convoy should be capable:
- of receiving these five variables from the lead aircraft (apart from the lead aircraft itself, which receives no information);
- of receiving these five variables from the preceding aircraft (apart from the aircraft situated just behind the lead aircraft, because it already receives this information); and
- of sending its own five variables to the following aircraft (or all of the convoy, for the lead aircraft).

It is possible to envisage reconstructing some of this information within each aircraft, from a more restricted list of variables, making it possible to reconstruct all of the necessary information.

| Variable | Lead aircraft | Preceding aircraft | Current aircraft |
|---|---|---|---|
| Curvilinear abscissa | reconstructed | reconstructed | $s_i$ |
| Longitudinal speed | $v_1$ | $v_{i-1}$ | $v_i$ |
| Lateral separation | reconstructed | reconstructed | $\tilde{y}_i$ |
| Angular separation | reconstructed | reconstructed | $\tilde{\psi}_i$ |
| Curvature at the current point | reconstructed | reconstructed | $c(s_i)$ |
| Coordinates of the aircraft | $(x_1, y_1)$ | $(x_{i-1}, y_{i-1})$ | unnecessary |
| Aircraft heading | $\tilde{\psi}_1$ | $\tilde{\psi}_i$ | unnecessary |

In practice, the position, the speed and the heading are information that can be exchanged by the current communication systems between aircraft. The reconstruction of the control variables requires a not-inconsiderable additional computation load:
- based on the position of the lead aircraft and of the preceding aircraft, and knowing that all of the convoy follows the same trajectory, the curvilinear abscissas $s_1$ and $s_{i-1}$, corresponding to the position of the target point along the trajectory, can be reconstructed;
- based on the curvilinear abscissas and the positions of the aircraft, the lateral separations $\tilde{y}_1$ and $\tilde{y}_{i-1}$ can be reconstructed;
- based on the curvilinear abscissas and the headings of the aircraft, the angular separations $\tilde{\psi}_1$ and $\tilde{\psi}_{i-1}$ can be reconstructed; and
- based on the curvilinear abscissas, the local curvatures $c(s_1)$ and $c(s_{i-1})$ can be reconstructed.

Moreover, if the computation capabilities of the aircraft do not make it possible to reconstruct all the missing variables, a simplified expression of the control law can be envisaged:

$$v_i = \frac{1 - \tilde{y}_i c(s_i)}{\cos(\tilde{\psi}_i)\left[1 + A(z_i)\left(s_1 - s_{i-1} - \sum_{n=1}^{i-1} D_n\right)\right]} \left(\sigma_i v_1 + \left[\begin{array}{c} 1 - \sigma_i + \\ A(z_i)\left(s_1 - s_{i-1} - \sum_{n=1}^{i-1} D_n\right) \end{array}\right] v_{i-1} + k_i c_i \right)$$

This law is based solely on the exogenous speeds $v_1$ and $v_{i-1}$, and on the exogenous curvilinear abscissas $s_1$ and $s_{i-1}$. However, it is necessary to reconstruct these two variables, based on the common trajectory and on the aircraft positions $(x_1, y_1)$ and $(x_{i-1}, y_{i-1})$, because the distance between aircraft, presented by the term $c_i$ in the control law, must be expressed, not as a Euclidian distance (2D distance in the plane (x,y), and therefore accessible via the positions of the aircraft), but as curvilinear abscissa s (1D distance, along the trajectory).

The table of the variables required for the simplified overall longitudinal control law therefore becomes:

| Variable | Lead aircraft | Preceding aircraft | Current aircraft |
|---|---|---|---|
| Curvilinear abscissa | reconstructed | reconstructed | $s_i$ |
| Longitudinal speed | $v_1$ | $v_{i-1}$ | $v_i$ |
| Lateral separation | unnecessary | unnecessary | $\tilde{y}_i$ |
| Angular separation | unnecessary | unnecessary | $\tilde{\psi}_i$ |
| Curvature at the current point | unnecessary | unnecessary | $c(s_i)$ |
| Coordinates of the aircraft | $(x_1, y_1)$ | $(x_{i-1}, y_{i-1})$ | unnecessary |
| Aircraft heading | unnecessary | unnecessary | unnecessary |

The following is valid only for the abovementioned (preferred) third embodiment (relating to an overall control).

The control calculated previously must be limited, in order for the controls applied to the members of the convoy to remain within acceptable ranges. In practice, the speeds applied to the convoy must not exceed the maximum speed of each of the aircraft, denoted $v_i^{max}$, and also not induce an excessive acceleration/deceleration.

The maximum speed $v_{convoy}^{max}$ of all of the convoy is set at the lowest maximum speed $v_i^{max}$:

$$v_{convoy}^{max} < \min_i(v_i^{max})$$

The speed $v_{convoy}^{max}$ must be strictly less than the lowest maximum speed, because the slowest aircraft must be allowed a margin for maneuver, in order for it to be able to catch up with the rest of the convoy if it drops back (in a turn, for example).

These considerations do not come under the control law of the aircraft of rank greater than or equal to 2, but the longitudinal control law of the lead aircraft.

Moreover, the abovementioned gain $k_i$ of the longitudinal control can be changed so as to avoid speed saturations of the members of the convoy.

The following applies:

$$0 \leq v_i \leq v_i^{max}$$

A controlled speed value (preferably supplied by a guidance means of a standard automatic taxiing system, called auto-taxi) can be used directly as maximum speed constraint:

$$v_i^{max} = v_i^{auto\text{-}taxi}$$

This approach offers the advantage of combining in a single speed control a trade-off between all the longitudinal constraints. In practice, the objective of the calculated control is the following of the convoy, but it can also take account of a trade-off between travel time and use of the actuators for example. Even if it is probably more advantageous to take account of such a trade-off at lead aircraft level, in order to apply it to all of the convoy, this approach shows that it is possible to incorporate particular constraints at the level of a given member.

The saturation of the gain $k_i$ is given by the following inequalities:

$$0 \leq k_i \leq \min\left(\frac{v_i^{max}(1+A(z_i)e_{i-1}^1)-\sigma_i v_1 - [1-\sigma_i+A(z_i)e_{i-1}^1]v_{i-1}}{c_i}, k_i^{max}\right) \quad \text{if } [1+A(z_i)e_{i-1}^1]c_i > 0$$

$$0 \leq k_i \leq \min\left(\frac{-\sigma_i v_1 - [1-\sigma_i+A(z_i)e_{i-1}^1]v_{i-1}}{c_i}, k_i^{max}\right) \quad \text{if } [1+A(z_i)e_{i-1}^1]c_i < 0$$

$$k_i = k_i^{max} \quad \text{if } 1+A(z_i)e_{i-1}^1 \neq 0 \text{ AND } c_i$$

Moreover, in order to be sure that the controlled speed does not exceed the maximum speed despite the precautions taken regarding the gain $k_i$, a limitation directly associated with the acceptable speed profile is added at the end of each computation string:

$$v_i \leq v_i^{auto\text{-}taxi}$$

For acceleration/braking capability and comfort reasons, the acceleration of each member of the convoy must also be limited so as to observe a certain number of constraints. In particular, if a longitudinal control that is different from that of auto-taxi is implemented, the longitudinal acceleration and jerk constraints that were present when generating the speed profile are lost. Since the real speed controlled by the device 1 will change within the speed profile generated by auto-taxi, there is no longer any guarantee regarding the accelerations/decelerations, except in cases where the control is limited by the profile. Such is the case in particular in deceleration mode for example on entering into a turn: the controlled speed for following the preceding aircraft is limited by the fact that it is necessary to decelerate before beginning the turn at reduced speed, in which case the real speed of the aircraft adheres to the speed profile, and the deceleration constraints are observed.

The following applies:

$$-a_{conf} \leq a_i \leq a_{conf}$$

where $a_{conf}$ is the comfort acceleration, the value of which is determined empirically, for example as a function of the acceleration and braking capabilities of the aircraft, and the longitudinal load factor that is deemed comfortable.

Since the acceleration of the preceding aircraft is not directly accessible, it can be estimated by numerical derivation of the speed:

$$a_{i-1}(t) = \frac{v_{i-1}(t) - v_{i-1}(t - T_e)}{T_e}$$

where $T_c$ is the sampling period of the computer on which this calculation is performed.

The saturation of the gain $k_i$ is then given by the following inequalities:

$$0 \leq k_i \leq \min\left(\sqrt{\frac{a_{conf}+a_{i-1}}{e_i^{i-1}}}, k_i^{max}\right) \quad \text{if } e_i^{i-1} > 0$$

$$0 \leq k_i \leq \min\left(\sqrt{\frac{-a_{conf}+a_{i-1}}{e_i^{i-1}}}, k_i^{max}\right) \quad \text{if } e_i^{i-1} < 0$$

$$k_i = k_i^{max} \quad \text{if } e_i^{i-1} = 0$$

$$0 \leq k_i \leq \frac{\sigma_i(v_{i-1}-v_1)}{c_i} \quad \text{if } \begin{cases} e_i^{i-1} < 0 \\ 1+A(z_i)\left(s_1 - s_{i-1} - \sum_{n=1}^{i-1} D_n\right) < 0 \\ c_i > 0 \end{cases}$$

Determined in this way, the adaptive gain $k_i$ can be used to obtain a rejoining dynamic range approaching a zero separation error $c_i$, compatible with the speed and acceleration capabilities at the current instant of the aircraft of rank i.

The control law synthesized previously offers good regulation efficiency in standard conditions. Moreover, the application of an adaptive gain and of speed and acceleration limitations makes it possible to ensure a realistic control for the actuators of the aircraft, and one that is comfortable for the passengers. However, the safety requirements may no longer be guaranteed in certain situations. In particular, on the abrupt stoppage of a member of the convoy, the latter may be struck by the following aircraft which cannot brake in time, its deceleration being limited. It is therefore necessary to consider these situations to guarantee a safe operation of the convoy.

For this, a monitoring module (means 28) is put in place, the aim of which is to authorize a widening of the deceleration authority in certain situations, in order to prioritize the safety of the convoy over passenger comfort.

The safety of the convoy is assured when there is no risk of collision between a member of the convoy and its direct neighbors (aircraft immediately in front and behind). In particular, each aircraft must not penetrate into the safety area of the preceding aircraft, defined by the distance $d_s$ introduced previously.

If the acceleration/deceleration of the aircraft of rank i is saturated by $a_{conf}$ (>0), an assessment of the safety is performed:
- if the acceleration is greater than $a_{conf}$ ($a_i > a_{conf} > 0$), the situation is such that the aircraft is more distant from the aircraft immediately preceding it than the desired separation. In this case, the acceleration $a_i$ can be limited to $a_{conf}$ without any risk of collision occurring; and
- the case where the aircraft is subject to deceleration greater than $-a_{conf}$ (therefore $a_i < -a_{conf} < 0$) occurs if the aircraft of rank (i-1) decelerates or stops abruptly. In this case, the risks of collision must be studied. For this, the first step is to predict the stopping distance $d_{stop}$ required for the aircraft of rank i with a comfortable deceleration $-a_{conf}$. This distance is given by the following relation:

$$d_{stop} = t_h v_i + \frac{v_i^2}{2a_{conf}}$$

In this expression:
- $t_f$ represents the duration needed for the aircraft of rank i, subject to a deceleration $-a_{conf}$ and from a speed $v_i$, to be able to stop; and
- $t_h$ is the latency delay (in seconds) needed for the aircraft to apply the calculated control. Thus, $t_h v_i$ is the distance traveled between the instant when the control is sent to the actuators, and the moment when the control is actually applied.

This predicted distance $d_{stop}$ is then subtracted from the current separation with the preceding aircraft Considering the extreme case (the preceding aircraft stops dead), the result obtained gives the final distance $d_{final}$ between the two aircraft on stopping:

$$d_{final} = (s_{i-1} - s_i) - t_h v_i - \frac{v_i^2}{2a_{conf}}$$

Depending on the distance value obtained, it is possible to predict whether the aircraft are out of reach, or whether there is a risk of a collision occurring:
- if the final distance $d_{final}$ is greater than the safety distance $d_s$, the acceleration $a_i$ can be limited to $-a_{conf}$ in total safety;
- otherwise, an emergency deceleration, denoted $-a_{urg}$, making it possible to obtain a final distance equal to $d_s$, is calculated with the following relation:

$$-a_{urg} = \frac{v_i^2}{2(d_s - (s_{i-1} - s_i) + t_h v_i)}$$

The acceleration $a_i$ is then limited by this value $-a_{urg}$. Only this case causes an acceleration that is different from the set limits ($-a_{urg} < -a_{conf}$) to be imposed. In this situation, safety is given priority at the cost of passenger comfort.

Finally, this emergency deceleration is itself limited by a maximum emergency deceleration $-a_{urg}^{max}$ which reflects the maximum braking capability of the aircraft:

$$-a_{urg}^{max} \leq -a_{urg} < -a_{conf}$$

The invention claimed is:

1. A method of generating a controlled speed for a following aircraft (Ai) taxiing on the ground in a convoy of aircraft (CA), whereby the following successive steps are performed automatically and repetitively:
   a) the current values of first parameters corresponding to parameters of at least one followed aircraft (Ai-1, A1) of said convoy (CA), which precedes said following aircraft (Ai) in said convoy (CA), are received;
   b) at least one longitudinal separation (Di) which must be observed between said followed aircraft (Ai-1) and said following aircraft (Ai) is generated;
   c) the current values of second parameters which correspond to parameters of said following aircraft (Ai) are measured; and
   d) using said current values of the first and second parameters and said longitudinal separation (Di), a controlled speed is calculated which represents a longitudinal speed instruction enabling the following aircraft (Ai) to taxi along a trajectory (TR) common to said convoy (CA) while maintaining said longitudinal separation (Di) relative to said followed aircraft, wherein, in the step d), said controlled speed $v_i$ is calculated using the following expression:

$$v_i = \frac{1 - \tilde{y}_i c(s_i)}{\cos(\tilde{\psi}_i)\left[1 + A(z_i)\left(s_1 - s_{i-1} - \sum_{n=1}^{i-1} D_n\right)\right]}$$

$$\left(\sigma_i \frac{v_1 \cos(\tilde{\psi}_1)}{1 - \tilde{y}_1 c(s_1)} + \left[\begin{array}{c} 1 - \sigma_i + \\ A(z_i)\left(s_1 - s_{i-1} - \sum_{n=1}^{i-1} D_n\right) \end{array}\right] \frac{v_{i-1} \cos(\tilde{\psi}_{i-1})}{1 - \tilde{y}_{i-1} c(s_{i-1})} + k_i c_i\right)$$

in which:
- $\tilde{y}_i$: is the lateral separation for an aircraft of rank i;
- $\tilde{y}_{i-1}$: is the lateral separation for an aircraft of rank i-1;
- $v_i$: is the longitudinal speed for the aircraft of rank i;
- $v_{i-1}$: is the longitudinal speed for the aircraft of rank i-1;
- $c(s_i)$: is the curvature at a current point for the aircraft of rank i;
- $c(s_{i-1})$: is the curvature at the current point for the aircraft of rank i-1;
- $\tilde{\psi}_i$: is the angular separation for the aircraft of rank i;
- $\tilde{\psi}_{i-1}$: is the angular separation for the aircraft of rank i-1;
- $s_{i-1}$: is the curvilinear abscissa for an aircraft of rank i-1;
- $s_1$: is the curvilinear abscissa for the leader aircraft;
- $\tilde{\psi}_1$: is the angular separation for the leader aircraft;
- $v_1$: is the longitudinal speed for the leader aircraft;
- $c(s_1)$: is the curvature at the current point of the leader aircraft;
- $A(z_i)$: is a quantity;
- $\sigma_i$: is a regulation parameter;
- $\tilde{y}_1$: is the lateral separation for the leader aircraft;
- $k_i$: is a gain;
- ci: is an appropriate set point; and
- $D_i$: is the longitudinal separation between the leader aircraft of rank i-1 and an aircraft of rank i.

2. The method as claimed in claim 1, wherein, in the step b), a fixed value is received for said longitudinal separation.

3. The method as claimed in claim 1, wherein, in the step b), said longitudinal separation Di is calculated using the following expression:

$$Di = di + f(vi)$$

in which:
- di is a fixed distance to be observed between the followed aircraft and the following aircraft;
- vi is the current speed of the following aircraft; and
- $f(vi)$ is a parameter that varies according to a function f that increases in relation to said current speed vi of the following aircraft.

4. The method as claimed in claim 1, wherein said regulation parameter $\sigma_i$ is defined between 0 and 1 and can be used to adjust the predominance between a step-by-step command and a leader-referenced command.

5. The method as claimed in claim 1, wherein said regulation parameter $\sigma_i$ corresponds to one of the following transitions:
- a linear transition;
- a sigmoidal transition; and
- a pseudo-sigmoidal transition.

6. The method as claimed in claim 5, wherein, in the step d), said gain $k_i$ is determined so as to avoid a saturation in speed and in acceleration.

7. The method as claimed in claim 6, wherein, in the step d), acceleration is monitored, so as to enable the deceleration authority of the following aircraft to be widened in case of risk of collision with a followed aircraft.

8. An automatic longitudinal guidance method for an aircraft (Ai) taxiing on the ground in a convoy of aircraft (CA), wherein the following series of successive operations is performed automatically and repetitively:
- A/ a controlled speed is generated, implementing the method specified as claimed in claim 1;
- B/ set points are calculated that are likely to be applied to control means (11) that act on the speed of the aircraft (Ai), said set points being such that, when applied to said control means (11), the latter pilot the aircraft longitudinally according to said controlled speed; and
- C/ the duly calculated set points are applied to said control means (11).

9. A device for generating a controlled speed for a following aircraft (Ai) taxiing on the ground in a convoy of aircraft (CA), said device (1) comprising:
- first means (12) for receiving the current values of first parameters corresponding to parameters of at least one followed aircraft (Ai-1, Ai) of said convoy (CA), that precedes said following aircraft (Ai) in said convoy (CA);
- second means (3) for generating at least one longitudinal separation (Di) which must be observed between said followed aircraft (Ai-1) and said following aircraft (Ai);
- third means (4) for measuring the current values of second parameters which correspond to parameters of said following aircraft (Ai); and
- fourth means (5) for calculating, using said current values of the first and second parameters and said longitudinal separation (Di), a controlled speed which represents a longitudinal speed instruction enabling the following aircraft (Ai) to taxi along a trajectory (TR) common to said convoy (CA) while maintaining said longitudinal separation (Di) relative to said followed aircraft, wherein said fourth means (5) are formed in such a way as to calculate said controlled speed $v_i$ using the following expression:

$$v_i = \frac{1 - \tilde{y}_i c(s_i)}{\cos(\tilde{\psi}_i)\left[1 + A(z_i)\left(s_1 - s_{i-1} - \sum_{n=1}^{i-1} D_n\right)\right]} \left(\sigma_i \frac{v_1 \cos(\tilde{\psi}_1)}{1 - \tilde{y}_1 c(s_1)} + \left[\begin{array}{c} 1 - \sigma_i + \\ A(z_i)\left(s_1 - s_{i-1} - \sum_{n=1}^{i-1} D_n\right) \end{array}\right] \frac{v_{i-1} \cos(\tilde{\psi}_{i-1})}{1 - \tilde{y}_{i-1} c(s_{i-1})} + k_i c_i\right)$$

in which:
- $\tilde{y}_i$: is the lateral separation for an aircraft of rank i;
- $\tilde{y}_{i-1}$: is the lateral separation for an aircraft of rank i-1;
- $v_i$: is the longitudinal speed for the aircraft of rank i;
- $v_{i-1}$: is the longitudinal speed for the aircraft of rank i-1;
- $c(s_i)$ is the curvature at a current point for the aircraft of rank i;
- $c(s_{i-1})$: is the curvature at the current point for the aircraft of rank i-1;
- $\tilde{\psi}_i$: is the angular separation for the aircraft of rank i;
- $\tilde{\psi}_{i-1}$: is the angular separation for the aircraft of rank i-1;
- $s_{i-1}$: is the curvilinear abscissa for an aircraft of rank i-1;
- $s_1$: is the curvilinear abscissa for the leader aircraft;
- $\tilde{\psi}_1$: is the angular separation for the leader aircraft;
- $v_1$: is the longitudinal speed for the leader aircraft;
- $c(s_1)$: is the curvature at the current point of the leader aircraft;
- $A(z_i)$: is a quantity;
- $\sigma_i$: is a regulation parameter;
- $\tilde{y}_1$: is the lateral separation for the leader aircraft;
- $k_i$: is a gain;
- ci: is an appropriate set point; and
- $D_i$: is the longitudinal separation between the leader aircraft of rank i-1 and an aircraft of rank i.

10. An automatic longitudinal guidance system for an aircraft (Ai) taxiing on the ground in a convoy of aircraft (CA), which comprises:
- a device (1) such as that specified under claim 9, for generating a controlled speed;
- control means (11) which act on the speed of the aircraft;
- means (12) for calculating set points likely to be applied to said control means (11), said set points being such that, when applied to said control means (11), the latter pilot the aircraft longitudinally according to said controlled speed; and
- means (13) for applying the duly calculated set points to said control means (11).

* * * * *